3,269,118
ACCESSORY CASE MOUNTING
Marcus C. Benedict, Glastonbury, and Paul A. Boris, Manchester, Conn., assignors to United Aircraft Corporation, East Hartford, Conn., a corporation of Delaware
Filed Apr. 28, 1965, Ser. No. 451,534
8 Claims. (Cl. 60—39.31)

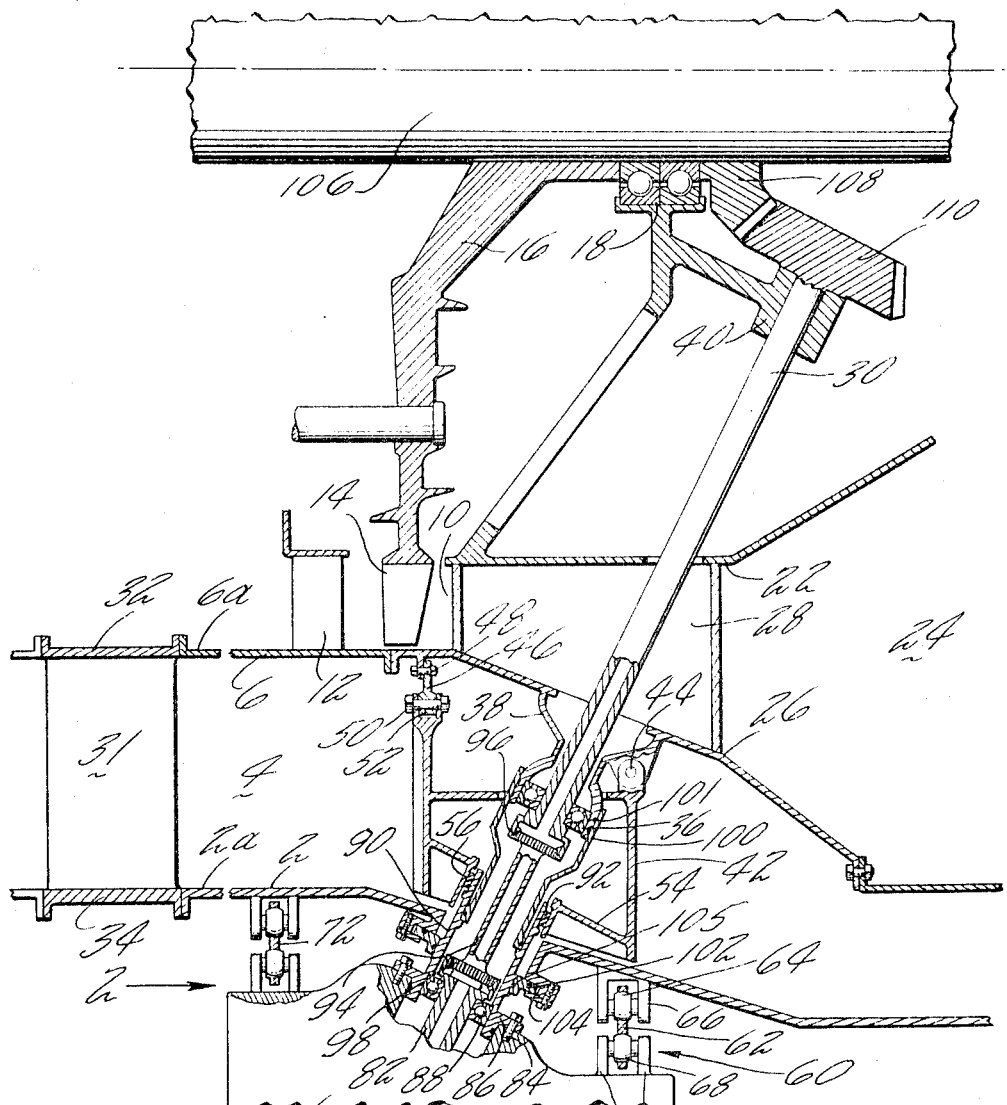

This invention relates to the mounting of an accessory case on a turbofan engine.

One feature of the invention is the support of the accessory from the fan duct but with alignment of the accessory drive shaft on the engine with the driven shaft in the accessory case maintained through a guide strut on the engine case. Another feature is the use of a piloting hub on the accessory case for maintaining shaft alignment but with independent support of the accessory case to allow limited movement of the fan duct without affecting shaft alignment.

The differences in thermal growth of the engine parts in operation necessitates improved arrangements for mounting the accessory case and this is particularly true of the turbofan engine in which the relatively cool air from the fan flows in an annular duct around the main engine case, the latter necessarily being much hotter with much greater thermal growth. One principal feature of this invention is the mounting of the accessory case on the engine so as not to affect the requisite thermal growth or to impose additional stresses within the engine structure but at the same time to maintain the necessary alignment of the drive elements between the engine shaft and the driven shaft in the accessory case.

One feature of the invention is the minimizing of vibration in the accessory case, since the mounting of the case through the flexible linkage upstream successfully damps out much of the vibration that would otherwise be carried from the main engine shaft.

Other features and advantages will be apparent from the specification and claims, and from the accompanying drawing which illustrates an embodiment of the invention.

FIG. 1 is a cross-sectional view of the accessory case mounting scheme and accessory drive mechanism taken transverse to the longitudinal axis of the engine.

FIG. 2 is a view of the accessory case mounting means taken parallel to the longitudinal axis of the engine in the direction of arrow 2 illustrating particularly the left and right-hand support mounts.

FIG. 3 is a side elevation of the accessory case mounting linkage illustrating particularly the construction of the right-hand support mount not shown in FIG. 1.

This invention is shown in connection with a turbofan engine which includes an outer duct wall 2 for the annular duct 4 through which the fan air passes and intermediate duct wall 6 between the compressor of the engine and the fan duct and an inner duct wall 8 forming the inner wall of the gas path 10 for gas from the compressor. Obviously the compressor casing duct is annular and carries on its inner wall rows of compressor stator vanes 12 which alternate with rows of blades 14 on the compressor rotor 16. The rotor is supported by bearings 18 on a bearing support 20 extending inwardly from the inner duct wall 8 which, as shown, constitutes a part of the diffuser section 22 of the engine leading to the burner section 24. An extension of the compressor casing or intermediate wall 6 is formed by the outer wall 26 of the diffuser section and the wall 26 is held in spaced relation to the inner duct wall 8 by a plurality of spacing vanes 28, one of which surrounds, as will be apparent, the accessory drive shaft 30.

The intermediate wall 6 is held in spaced relation radially with respect to the outer wall 2 by a plurality of spacing vanes 31 each having an inner shroud 32 attached as by bolts to a forward projection 6a of the wall 6 and outer shroud 34 secured as by bolts to a forward projection 2a of the outer wall 2.

The outer end of the accessory shaft 30 is supported in a bearing 36 in a hub 38 provided by the intermediate wall 6 and the supporting structure above described retains the bearings 36 in alignment with the bearing 40 supported adjacent the inner end of the accessory shaft from the bearing support 20.

A supporting strut 42 is mounted on the intermediate wall 6 in surrounding relation to the hub 8. This strut is supported adjacent the trailing edge by a transverse pin 44 which permits pivotal movement about the strut at this point. The leading edge of the strut is supported from the intermediate case 6 through a support 46 secured to the intermediate case as by bolts 48. The opposite end of the support 46 is attached in two places as by bolts 50 to the strut and the support is of such a dimension as to provide clearance between the support and the adjacent parts of the strut so that there is a limited freedom of movement in an axial direction. The strut 42 has a partition 54 therein which provides a sleeve 56 which under normal operating conditions is in alignment with the axis of the accessory shaft.

The accessory case 58 is supported from the outer case 2 by three mounts. The aft mount 60 is in the form of a link 62 mounted on a spherical bearing 64 carried between spaced flanges 66 on the outer case, the other end of the link 62 is mounted on a spherical bearing 68 positioned between spaced flanges 70 on the accessory case thereby allowing for freedom of movement both circumferentially and axially. One of the forward mounts, as shown in FIG. 1, is similar in construction utilizing a link 72 supported in substantially the same manner as the link 62. The other forward mount which is spaced circumferentially from the link 72 consists of a rigid projection 74 on the accessory case slidably movable in an axial direction on a pin 76 between flanges 78 on the outer case 2. As shown in FIG. 3, the arrangement is such that clearance 80 is provided between the projection 74 and the flanges 78 to allow an axial freedom of movement between the accessory case and the outer case in this location. With a mounting of this character the expansion of the accessory case with respect to the outer case 2 is not restricted in any way but the accessory case is nevertheless supported such that the driven shaft 82 therein is substantially in alignment with the accessory shaft 30.

The accessory case has mounted thereon as by bolts 84 a hub 86 in which the bearing 88 for the driven shaft 82 is positioned and an integral sleeve 90 on the hub fits within and is guided by the sleeve 56 in the strut 42. A suitable wear-resistant ring 92 positioned between the sleeve 90 and the sleeve 56 permits a relative radial movement therebetween without affecting the piloting characteristics of the cooperating sleeves. The rigidity of the hub 86 and its integral sleeve 90 is such that the hub and sleeve hold the accessory in such a position that the bearing 88 is always concentric so the sleeve 56 and thereby normally in alignment with the accessory shaft 30.

A quill 94 provides a drive connection between the accessory shaft 30 and the driven shaft 82 having cooperating splines 96 at the accessory shaft end and similar splines 98 at the driven shaft end so that any slight misalignment will be compensated for without developing any undesirable stresses in either shaft. The splines 96 and 98 are conventional splines which permit a slight misalignment without affecting the drive therebetween.

Leakage of lubricant from the bearing 36 is prevented by a sleeve 100 which has sliding engagement at one end with the periphery of the hub 38 as shown and fits within and has sliding relationship with the sleeve 90 at its other end. This sleeve, as is apparent, surrounds and is out of contact with accessory shaft 30 and the quill 94. O-ring seals 101 provide for sliding movement as necessary and at the same time prevent leakage past the sliding surfaces.

A collar 102 surrounds the sleeve 90 adjacent to the hub 86 to control fan air leakage while permitting slight radial movement. Clearance 104 around the periphery of the collar 102 permits a slight lateral movement at this point to compensate for relative thermal expansion between intermediate case 6 and the outer case 2.

Suitable O-ring seals 105 are provided to control leakage around this collar 102.

With the arrangement shown, when the rotor 16 is turned the drive is transmitted from the rotor through the shaft 106 and a gear 108 thereon to the cooperating gear 110 on the inner end of the accessory shaft. Rotation of the shaft 30 is transmitted through the quill to the driven shaft 82. As the engine approaches and reaches designed conditions the intermediate case 6 expands a substantially greater amount than the cooler outer case 2. The bearing 36 supports the outer end of the accessory shaft so that this shaft does not move with respect to the intermediate case 6 and the sleeve 56 supports the accessory case such that the bearing 88 for the driven shaft 82 will be retained in alignment with the bearing 36 and the accessory shaft 30. However, the relative axial movement of the outer case with respect to the intermediate case may still take place since the supporting mounts for the accessory case permit relative axial movement between the accessory case and the outer case 2.

It is to be understood that the invention is not limited to the specific embodiment herein illustrated and described, but may be used in other ways without departure from its spirit as defined by the following claims.

We claim:
1. A mounting for an accessory casing on a turbofan engine including a main engine case having an accessory drive shaft extending substantially radially therefrom, an annular fan air duct surrounding and in spaced relation to the main engine case, an accessory case externally of the fan air duct and having a plurality of flexible mounts supporting the case on the duct, one of said mounts preventing radial movement and circumferential movement but permitting axial movement of the accessory case relative to the annular duct and the other mounts permitting axial and circumferential movement without radial movement, a strut extending across the space between the engine case and the fan duct and securely mounted on the engine case, said strut surrounding the accessory shaft, a sleeve rigidly mounted on the accessory case and a guide sleeve within the strut to receive and support the first sleeve therein for radial sliding movement only.

2. A mounting for an accessory casing as in claim 1 in which the engine case has a bearing therein for the accessory shaft, the accessory case has a bearing therein in substantial alignment with the main case bearing for a driven shaft in the accessory case, and a drive quill connects the accessory shaft to the driven shaft.

3. A mounting for an accessory casing as in claim 2 in which the sleeve mounted on the accessory case surrounds the quill and is in alignment with the bearing in the accessory case.

4. A mounting for an accessory casing as in claim 1 in which the strut has a pivotal connection at one point to the engine case, and two axially slidable connections at a point axially spaced from the pivotal connection.

5. A mounting for an accessory case on a turbofan engine, including a main engine case having a laterally projecting accessory drive shaft therein, a bearing in said casing supporting said shaft, a strut mounted securely on and extending outwardly from said case, an outer casing supported on and arranged in spaced relation to the engine case, an accessory case mounted on said outer case and having a bearing therein in substantial alignment with said bearing in the main case, means supporting said accessory case for limited axial and lateral movement on the outer casing but without radial movement therebetween, a projecting hub rigidly mounted on said accessory case in alignment with the bearing therein and a guide on said strut to receive and align the hub, said guide being axially aligned by said strut with the bearing in the main case.

6. A mounting for an accessory casing as in claim 5 in which the bearing in the accessory case supports a driven shaft and a quill shaft connects the accessory shaft to the driven shaft.

7. A mounting for an accessory casing as in claim 6 in which the main case has a projecting bearing support to receive the accessory shaft bearing, and a sleeve extending from said support to said hub surrounds said quill shaft and has fluid tight slidable connections with both the support and the hub to retain the lubricant within the hub and support.

8. A mounting for an accessory casing as in claim 5 in which the accessory case supporting means includes at least three supporting links, one of which provides for relative movement between accessory case and the supporting outer case only in an axial direction, and the others of which provide for both axial and lateral movement.

References Cited by the Examiner

UNITED STATES PATENTS

| | | | |
|---|---|---|---|
| 2,803,943 | 8/1957 | Rainbow | 60—35.6 |
| 2,978,869 | 4/1961 | Hiscock | 60—39.31 X |

FOREIGN PATENTS 717,679  11/1954  Great Britain.

MARK NEWMAN, *Primary Examiner.*

RALPH D. BLAKESLEE, *Examiner.*